US011327604B2

(12) United States Patent
He et al.

(10) Patent No.: US 11,327,604 B2
(45) Date of Patent: May 10, 2022

(54) TOUCH SENSING CIRCUIT THAT SELECTIVELY COUPLES A SENSING ELECTRODE TO A REFERENCE VOLTAGE IN RESPONSE TO AN ASSERTION OF A SYNCHRONIZATION SIGNAL AND TOUCH SENSITIVE DEVICE

(71) Applicant: HIMAX TECHNOLOGIES LIMITED, Tainan (TW)

(72) Inventors: Jia-Ming He, Tainan (TW); Yaw-Guang Chang, Tainan (TW); Yu-Chun Lin, Tainan (TW); Yi-Yang Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/013,842

(22) Filed: Sep. 7, 2020

(65) Prior Publication Data
US 2022/0075499 A1 Mar. 10, 2022

(51) Int. Cl.
*G06F 3/041* (2006.01)
*G06F 3/044* (2006.01)

(52) U.S. Cl.
CPC ........ *G06F 3/04184* (2019.05); *G06F 3/0446* (2019.05)

(58) Field of Classification Search
None
See application file for complete search history.

(56) References Cited

U.S. PATENT DOCUMENTS

| 2011/0210941 | A1* | 9/2011 | Reynolds | G09G 5/18 345/174 |
| 2014/0146010 | A1* | 5/2014 | Akai | G06F 3/04166 345/174 |
| 2015/0177885 | A1* | 6/2015 | Noto | G06F 3/0412 345/174 |

* cited by examiner

Primary Examiner — Kirk W Hermann
(74) Attorney, Agent, or Firm — Winston Hsu (57) ABSTRACT

A touch sensing circuit for use in a touch sensitive device includes: an integrator, a first switching unit and a control signal generator. The integrator, coupled to at least one sensing electrode of a touch panel in the touch sensitive device, and arranged to collect charges on the at least one sensing electrode and accordingly generate an output sensed signal. The first switching unit is arranged to selectively couple a first end of the at least one sensing electrode to a reference voltage level according to a first mask signal. The control signal generator is arranged to generate the first mask signal according to a synchronization signal of a display panel in the touch sensitive device, wherein the first switching unit couples the first end of the at least one sensing electrode to the reference voltage level when the synchronization signal is asserted.

11 Claims, 11 Drawing Sheets

TOUCH SENSING CIRCUIT THAT SELECTIVELY COUPLES A SENSING ELECTRODE TO A REFERENCE VOLTAGE IN RESPONSE TO AN ASSERTION OF A SYNCHRONIZATION SIGNAL AND TOUCH SENSITIVE DEVICE

BACKGROUND OF THE INVENTION

1. Field of the Invention

The invention relates to touch sensitive devices incorporating display and touch panels, and more particularly, to devices that prevent noises from a display panel interfering with touch sensing with respect to a touch panel.

2. Description of the Prior Art

Electronic devices have become smaller and thinner to meet user demand. Therefore, a touch screens incorporating a display panel with a touch panel are widely used in electronics, such as laptop computers, car navigation devices, e-books and smartphones. A user directly contacts the touch screen with a touch mechanism such as a finger, pen, stylus, or the like in order to input information (e.g., data and/or commands) to the device. Certain types of display panels, including liquid crystal display (LCD) panels, organic light-emitting diode (OLED) panels, and the like, are commonly used as the display panel.

The touch panel is formed by conductive electrodes that are arranged in two mutually perpendicular directions. There will be capacitances between intersections of the electrodes. A sensing circuit coupled to the electrodes can detect a change in capacitance associated with a touch event thereupon. However, as the touch panel is also disposed close to the display panel, there will be parasitic capacitances between the touch panel and the display panel. In modern designs, the touch screen is required to be more compact, and the distance between the touch panel and the display panel is significantly reduced, which causes the parasitic capacitance between the touch panel and the display panel to become considerably large. Therefore, signals that are intended to drive pixels of the display panel may unwantedly be coupled to the touch panel and severely interfere with the touch sensing

SUMMARY OF THE INVENTION

With this in mind, it is one object of the present invention to provide devices to suppress interferences of electrical noise from a display panel. Embodiments of the present invention feature switching units in a sensing control circuit, where the switching units are controlled according to synchronization signals of the display panel. These switching units could prevent charges introduced by the noise from the display panel to be collected by the sensing control circuit when the synchronization signal of the display panel is asserted. In addition, the present invention also suspends operations of components (e.g. analog-to-digital converter) in the sensing control circuit when the synchronization signal is asserted. This is because the synchronization signal is associated with refresh operations of the display panel, in which large voltages will be applied to the display panel and leads to a significant electrical noise. Hence, the present invention uses switching units and controls over the sensing control circuit in order not to collect the charges generated while the display panel is refreshed.

According to one embodiment of the present invention, a touch sensing circuit for use in a touch sensitive device is provided. The touch sensing circuit comprises an integrator, a first switching unit and a control signal generator. The integrator is coupled to at least one sensing electrode of a touch panel in the touch sensitive device and arranged to collect charges on the at least one sensing electrode and accordingly generate an output sensed signal. The first switching unit is coupled to a first end of the at least one sensing electrode, arranged to selectively couple the first end of the at least one sensing electrode to a reference voltage level according to a first mask signal. The control signal generator is coupled to the first switching unit, and arranged to generate the first mask signal according to a synchronization signal of a display panel in the touch sensitive device, wherein the first switching unit couples the first end of the at least one sensing electrode to the reference voltage level when the synchronization signal is asserted.

According to one embodiment, a touch sensitive device is provided. The touch sensitive device comprises: a display panel, a touch panel and a touch sensing circuit. The touch panel is disposed above the display panel and has a plurality of driving electrodes and a plurality of sensing electrodes. The touch sensing circuit is coupled to the touch panel and arranged to detect a touch event on the touch panel, comprising: a driving control circuit and a sensing control circuit. The driving control circuit is coupled to at least one of the driving electrode, and arranged to provide a driving signal to the at least one driving electrode. The sensing control circuit is coupled to at least one of the sensing electrodes, and arranged to generate an output sensed signal according to charges on the at least one sensing electrode. The sensing control circuit comprises: an integrator, a first switching unit and a control signal generator. The integrator is coupled to the at least one sensing electrode, and arranged to collect charges on the at least one sensing electrode and accordingly generate the output sensed signal. The first switching unit is coupled to a first end of the at least one sensing electrode, and arranged to selectively couple the first end of the at least one sensing electrode to a reference voltage level according to a first mask signal. The control signal generator is coupled to the first switching unit, and arranged to generate the first mask signal according to a synchronization signal of the display panel, wherein the first switching unit couples the first end of the at least one sensing electrode to the reference voltage level when the synchronization signal is asserted.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Overview

Figure 1:
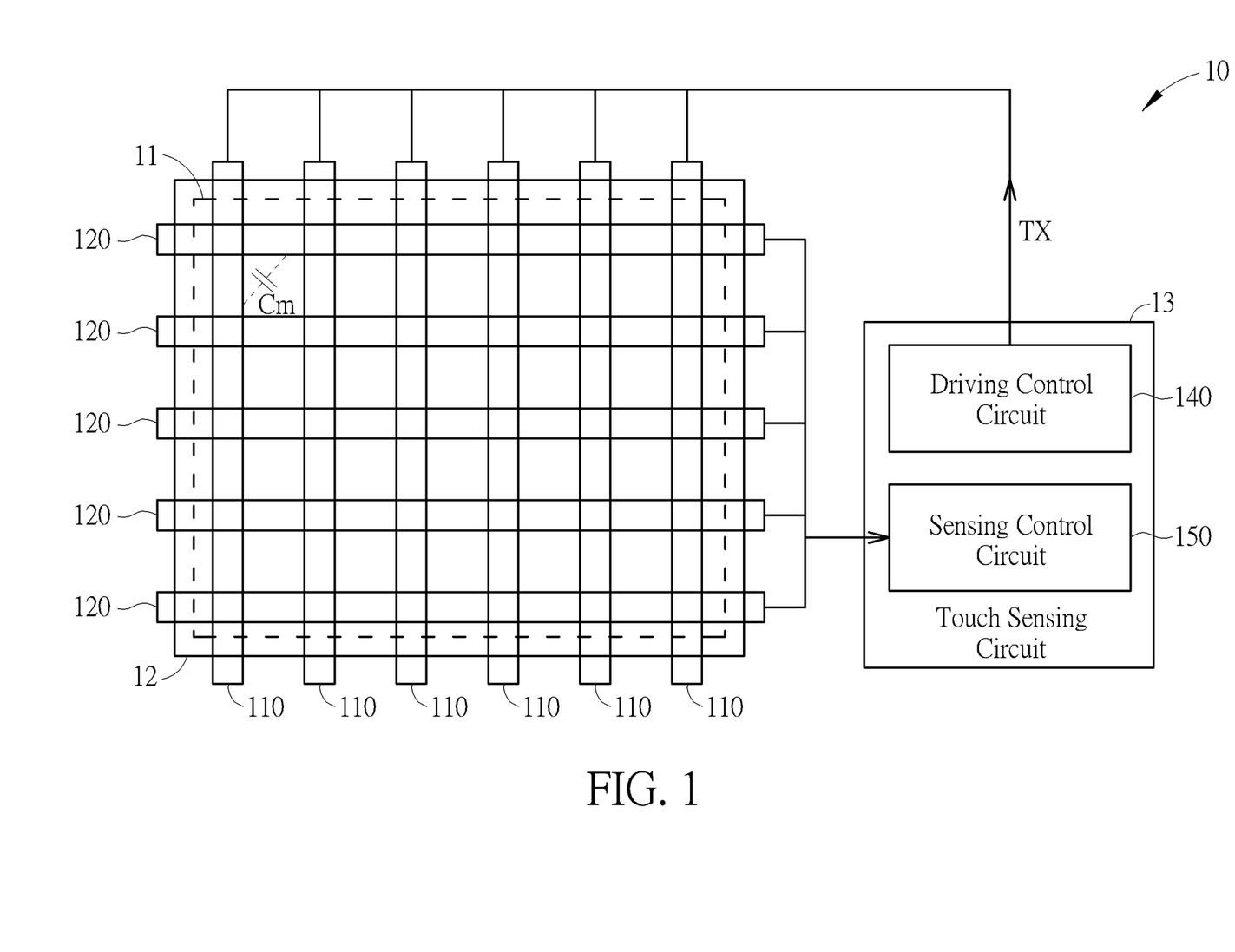
FIG. 1 illustrates a schematic diagram of a touch sensitive device according one embodiment of the present invention.

Please refer to FIG. 1, illustrates an overview of a touch sensitive device 10 according to one embodiment of the present invention. A touch sensitive device 10 comprises a touch panel 11, a display panel 12 and a touch sensing circuit 13. The touch panel 11 comprises a plurality of driving electrodes 110 and a plurality of sensing electrodes 120. The driving electrodes 110 and the sensing electrodes 120 are disposed on the display panel 12. The driving electrodes 110 and the sensing electrodes 120 can be formed from transparent conductive materials. Preferably, the driving electrodes 110 and the sensing electrodes 120 can be perpendicular to each other, thereby to form a coordinate system and each coordinate location comprises a capacitor Cm formed at the intersection of the driving electrodes 110 and the sensing electrodes 120. The driving electrodes 110 and the sensing electrodes 120 are used to detect a change in capacitance of the capacitor Cm at the intersections due to a touch event performed over the display panel 12. The display panel 12 could be a liquid crystal display (LCD) or an organic light emitting diode (OLED) panel.

The touch sensing circuit 13 comprises a driving control circuit 140 and a sensing control circuit 150. The driving electrodes 110 are coupled to an output of the driving control circuit 140, while the sensing electrodes 120 are coupled to an input of the sensing control circuit 150. Specifically, the touch sensitive device 10 may have one or more multiplexers (not shown) to select one of the driving electrodes 110 to be coupled to the output of the driving control circuit 140 and select one of the sensing electrodes 120 to be coupled to the input of the sensing control circuit 150. Alternatively, the touch sensitive device 10 may have more than one driving control circuits 140 to drive the driving electrodes 110 and more than one sensing control circuits 150 to sense the sensing electrodes 120.

According to various embodiments, the driving control circuit 140 and the sensing control circuit 150 may be fabricated onto a single integrated circuit chip (IC) device or discrete IC chips. The driving control circuit 140 is coupled to one or more driving electrodes 110 so that the driving control circuit 140 outputs a driving signal TX having sinusoid characteristics that drives the one or more driving electrodes 110. Accordingly, charges can be transferred to one or more sensing electrodes 120 via a capacitor Cm between the driving electrodes 110 and the sensing electrodes 120, and eventually to the sensing control circuit 150.

During touch sensing operation of the touch sensing circuit 13, noises could be randomly coupled to the sensing control circuit 140 through parasitic capacitances between the touch panel 11 and the display panel 12. Therefore, the sensing control circuit 140 is designed and operable to exclude the interference caused by the display panel 12.

Embodiments I

Figure 2:
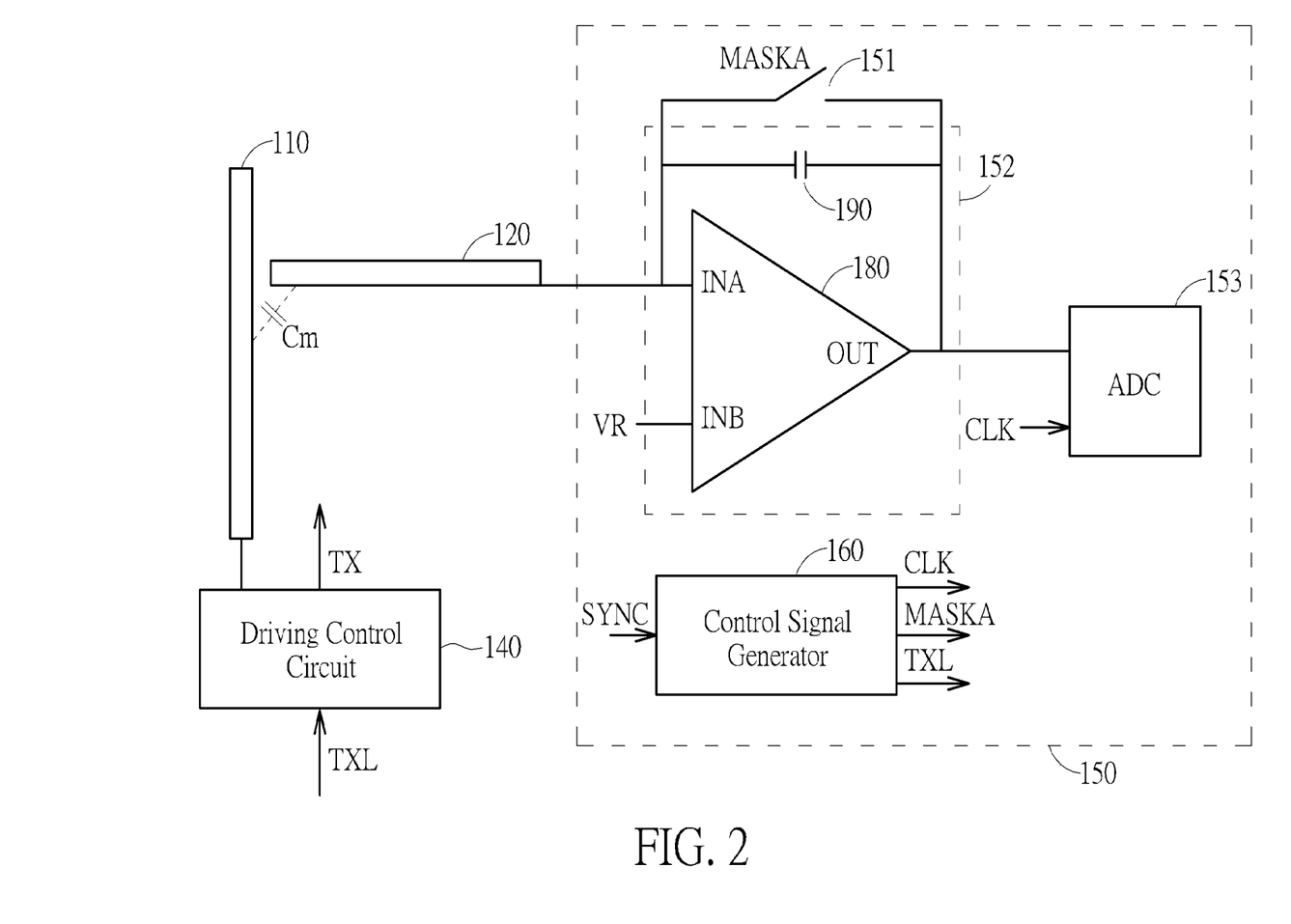
FIG. 2 illustrates a detailed block diagram of a touch sensing circuit according one embodiment of the present invention.

Please refer to FIG. 2, which illustrates a detailed block diagram of the sensing control circuit 150 according to one embodiment of the present invention. The sensing control circuit 150 comprises a switching unit 151, an integrator 152, an analog-to-digital converter (ADC) 153 and a control signal generator 160. The integrator 152 is coupled to at least one of the sensing electrodes 120 and arranged to collect charges on the at least one electrodes 120.

In one embodiment, the integrator 152 comprise an amplifier 180 with an integrating capacitor 190 coupled across an input terminal INA and an output terminal OUT of the amplifier 180. The amplifier 180 also includes another input terminal INB, which is coupled to a reference voltage level VR. The amplifier 180 is arranged to collect charges on the sensing electrode 120 and transfer them to the integrating capacitor 190, thereby to generate an output sensed signal at the output terminal OUT. Accordingly, the output sensed signal is proportional to the charge stored in the integrating capacitor 190. The ADC 153 is arranged to convert the output sensed signal into digital values.

The switching unit 151 is also coupled to a first end of the sensing electrode 120 and arranged to selectively conduct a path between the first end of the sensing electrode 120 and the output terminal of the integrator 152 according to a mask signal MASKA. Once the switching unit 151 conducts the path between the first end of the sensing electrode 120 and the output terminal OUT of the integrator 152, the first end of the sensing electrode 120 will be virtually shorted to the reference voltage level VR, such that no charge will be transferred to the integrating capacitor 190.Thus, the noise from the display panel 12 cannot interfere with the result of touch sensing as long as the switching unit 151 is conducted.

Figure 3A:
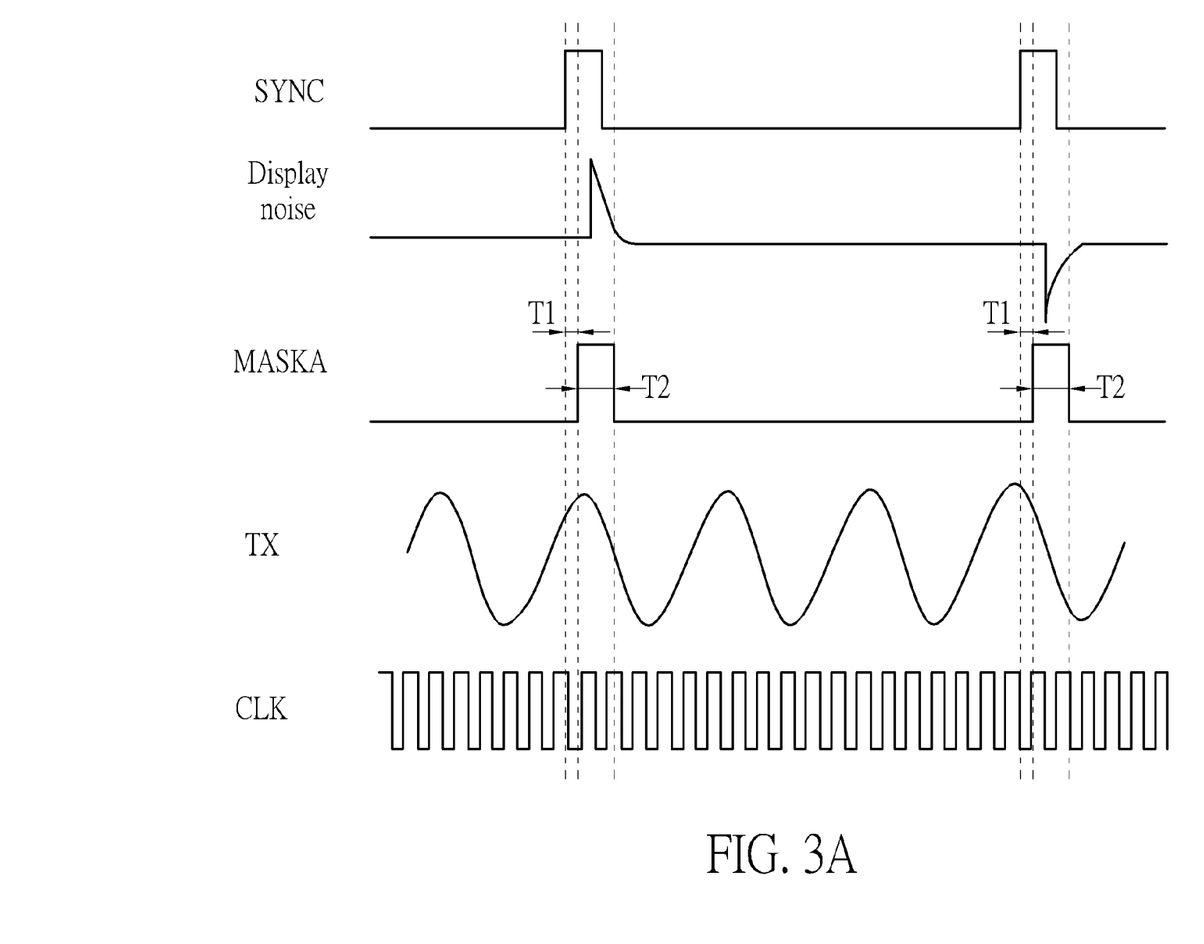
FIG. 3 illustrates waveforms of signals in the touch sensing circuit of FIG. 2 according a first embodiment of the present invention.

The control signal generator 160 is used generate the mask signal MASKA according to a synchronization signal of the display panel 12. In one embodiment, the mask signal MASKA controls the switching unit 151 to conduct the path when the synchronization signal is asserted. Please refer to FIG. 3 for further details. As illustrated, when the synchronization signal SYNC is asserted, the control signal generator 160 could assert the mask signal MASKA to conduct the switching unit 151 after a time period T1 passes, where the length of the time period T1 is variable and controllable by the control signal generator 160 (; as illustrated by another embodiment of FIG. 3A, the time period T1 could be shorter than it is in the embodiment of FIG. 3). The intended purpose of delaying the assertion of the mask signal MASKA is because the noise caused by the display panel 12 results from refresh operations of the display panel 12. During the refresh operation, large driving voltages are applied to pixel circuits of the display panel 12, which leads to the noise to the touch panel 11. However, the refresh operations are performed after the assertion of the synchronization signal SYNC. Therefore, conducting the switching unit 151 later will be more effective to prevent the interference caused by the display panel 12.

Moreover, a time period T2 in which the mask signal MASKA conducts the switching unit 151 could be also variable and controllable by the control signal generator 160 depending on different requirements.

Figure 4:
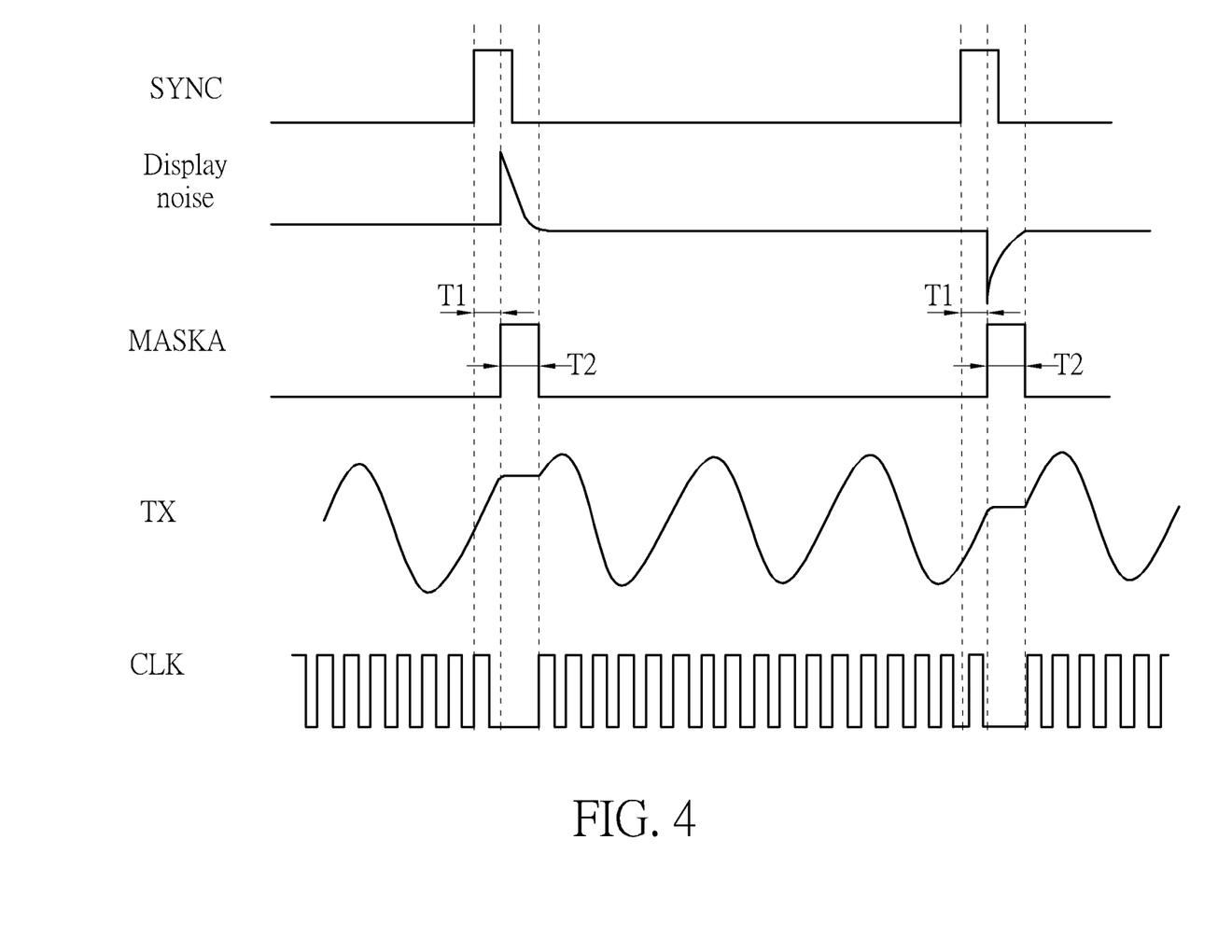
FIG. 4 illustrates waveforms of signals in the touch sensing circuit of FIG. 2 according a second embodiment of the present invention.

In another embodiment, the control signal generator 160 is further arranged to control the clock signal CLK and the driving signal TX. While asserting the mask signal MASKA, the control signal generator 160 could stop providing the clock signal CLK to the ADC 153, such that the conversion operation of the ADC 153 will be accordingly suspended. In addition, the control signal generator 160 could provide a control signal TXL to the driving control circuit 140 to freeze a state of the driving signal TX while asserting the mask signal MASKA. Please refer to FIG. 4 for further details. As illustrated, during time period T2, the clock signal CLK is stopped and the state of the driving signal TX is frozen. After the mask signal MASKA is de-asserted, the clock signal CLK recovers and the driving signal TX continues to oscillate. In various embodiments, the time period in which the clock signal CLK is stopped could be longer or shorter than the time period T2 in which the switching unit 151 is conducted. Furthermore, the time period in which the state of the driving signal TX is frozen could be also longer or shorter than the time period T2 in which the switching unit 151 is conducted.

Figure 3B:
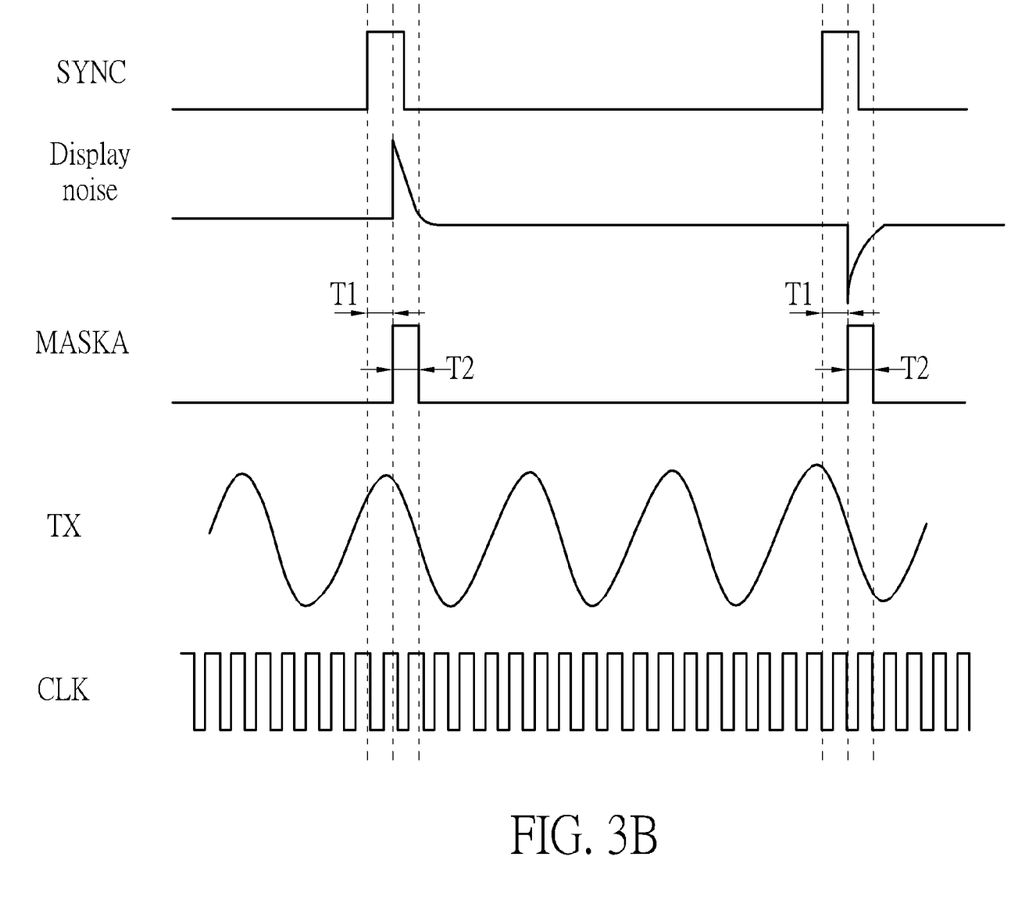
Figure 3C:
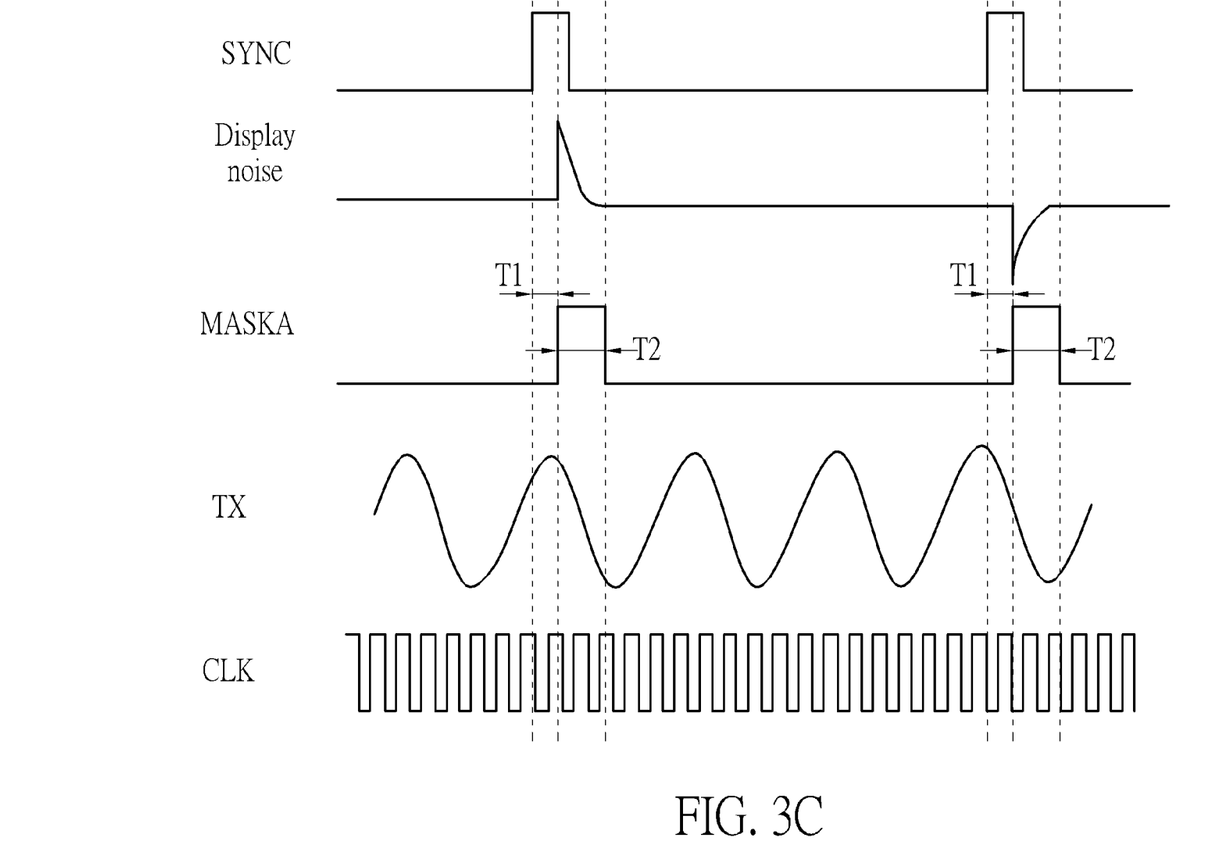

According to one embodiment of the present invention, the synchronization signal is Hsync signal for driving the display panel 12. In addition, the time period T2 in which the switching unit 151 is conducted by the mask signal MASKA could be longer or shorter than the time period in which the Hsync signal for driving the display panel 12 is asserted (as shown by FIG. 3B and FIG. 3C).

Embodiments II

Figure 5:
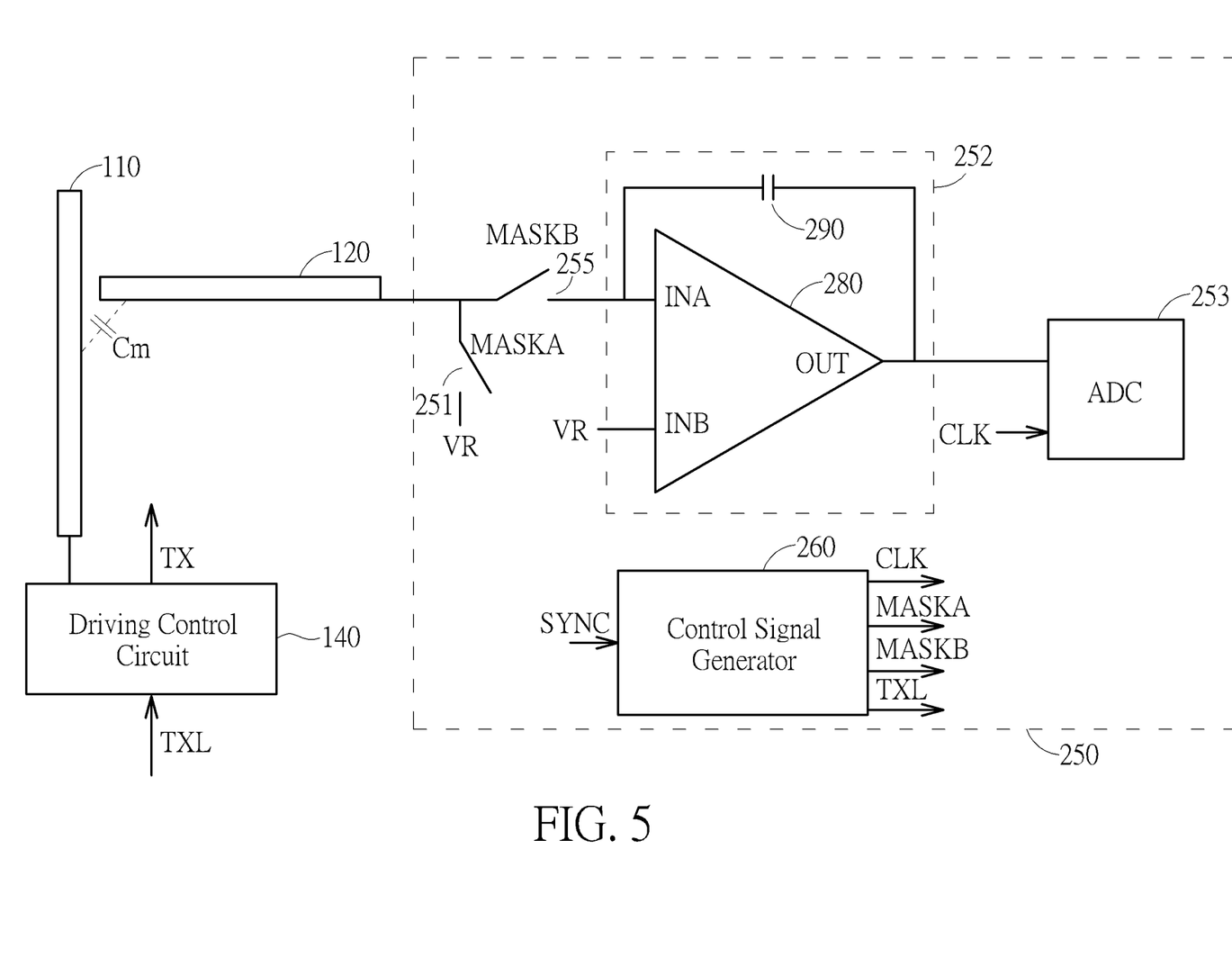
FIG. 5 illustrates a detailed block diagram of a touch sensing circuit according one embodiment of the present invention.

Please refer to FIG. 5, which illustrates a detailed block diagram of alternative design of the sensing control circuit according to one embodiment of the present invention. As illustrated, a sensing control circuit 250 comprises a first switching unit 251, a second switching unit 255, an integrator 252, an analog-to-digital converter (ADC) 253 and a control signal generator 260. The integrator 252 is selectively coupled to at least one of the sensing electrodes 120 and arranged to collect charges on the at least one electrodes 120.

In one embodiment, the integrator 252 comprise an amplifier 280 with an integrating capacitor 290 coupled across an input terminal INA and an output terminal OUT of the amplifier 280. The amplifier 280 also includes another input terminal INB, which is coupled to a reference voltage level VR. The amplifier 280 is arranged to collect charges on the sensing electrode 120 and transfer them to the integrating capacitor 290, thereby to generate an output sensed signal at the output terminal 282. Accordingly, the output sensed signal is proportional to the charge stored in the integrating capacitor 290. The ADC 253 is arranged to convert the output sensed signal into digital values.

The first switching unit 251 is coupled between the first end of the sensing electrode 120 and the reference voltage level VR, and arranged to selectively conduct a path between the first end of the sensing electrode 120 and the reference voltage level VR according to a mask signal MASKA. Once the switching unit 251 conducts the path between the first end of the sensing electrode 120 and the reference voltage level VR, no charge will be transferred to the integrating capacitor 290. Thus, the noise from the display panel 12 cannot interfere with the result of touch sensing as long as the switching unit 251 is conducted.

Moreover, the second switching unit 255 is coupled between the first end of the sensing electrode 120 and the input terminal INA of the amplifier 280, arranged to selectively conduct a path between the first end of the sensing electrode 120 and the input terminal INA of the amplifier 280 according to a mask signal MASKB. Once the second switching unit 255 does conduct the path between the first end of the input terminal INA of the amplifier 280, no charge will be transferred to the integrating capacitor 290. Thus, the noise from the display panel 12 cannot interfere with the result of touch sensing as long as the switching unit 255 is not conducted.

The control signal generator 260 is used to generate the mask signals MASKA and MASKB according to a synchronization signal of the display panel 12. In one embodiment, the mask signal MASKA controls the switching unit 251 to conduct when the synchronization signal is asserted. The mask signal MASKB controls the switching unit 245 not to conduct when the synchronization signal is asserted. Please refer to FIG. 6 for further details. As illustrated, when the synchronization signal SYNC is asserted, the control signal generator 260 could assert the mask signal MASKA to turn on the switching unit 251 after a time period Ti passes, where the length of the time period T1 is variable and controllable by the control signal generator. In addition, when the synchronization signal SYNC is asserted, the control signal generator 260 could de-assert the mask signal MASKB to turn off the switching unit 255 after a time period T3 passes. According to various embodiments, the time period T1 could be longer or shorter than the time period T3.

Figure 6:
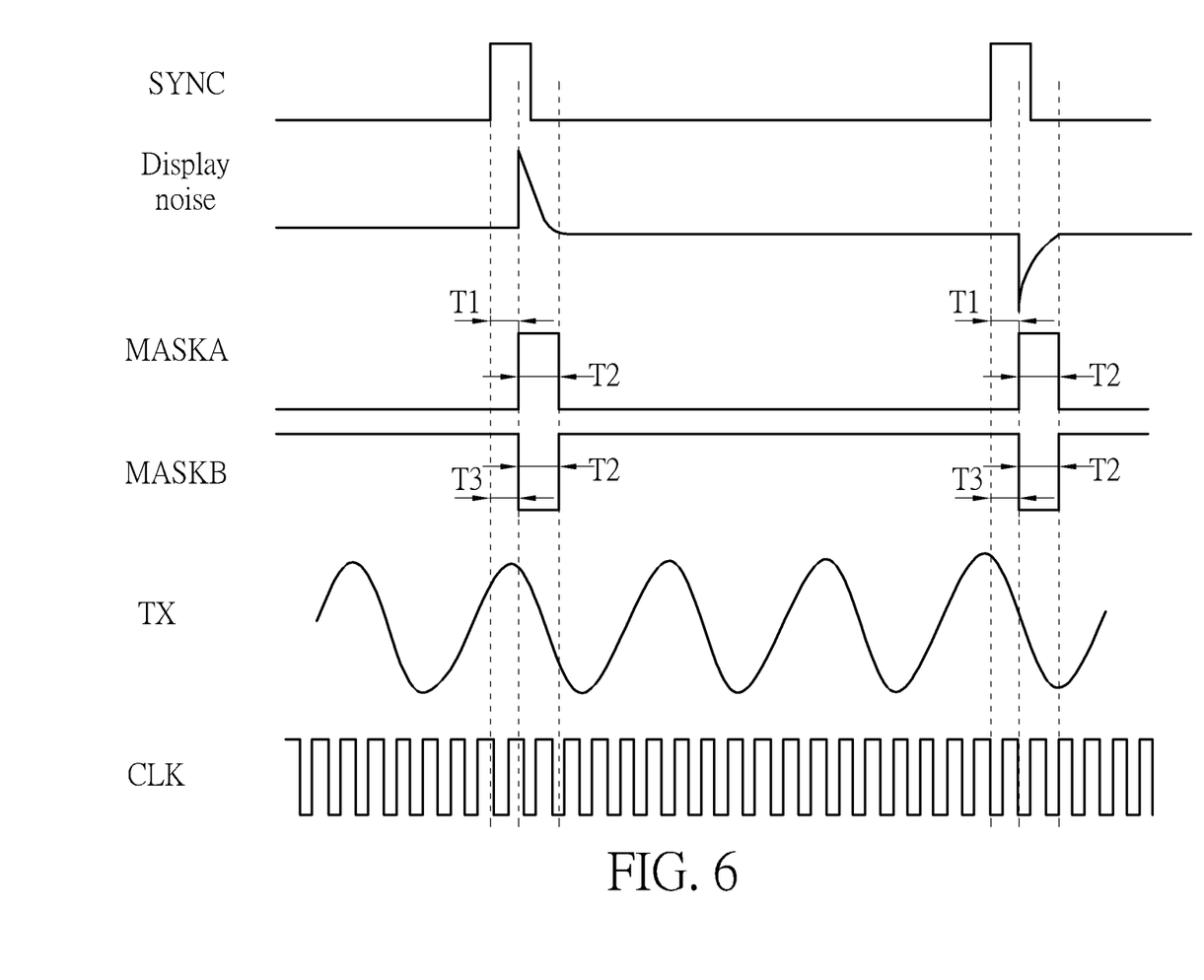
FIG. 6 illustrates waveforms of signals in the touch sensing circuit of FIG. 5 according a first embodiment of the present invention.

Moreover, a time period T2 in which the mask signal MASKA turns on the switching unit 251 and the mask signal MASKB turns off the switching unit 255 could be also variable and controllable by the control signal generator 260 depending on different requirements. Alternatively, the time period in which MASKA turns on the switching unit 251 could be shorter or longer than the time period in which the mask signal MASKB turns off the switching unit 255.

Figure 7:
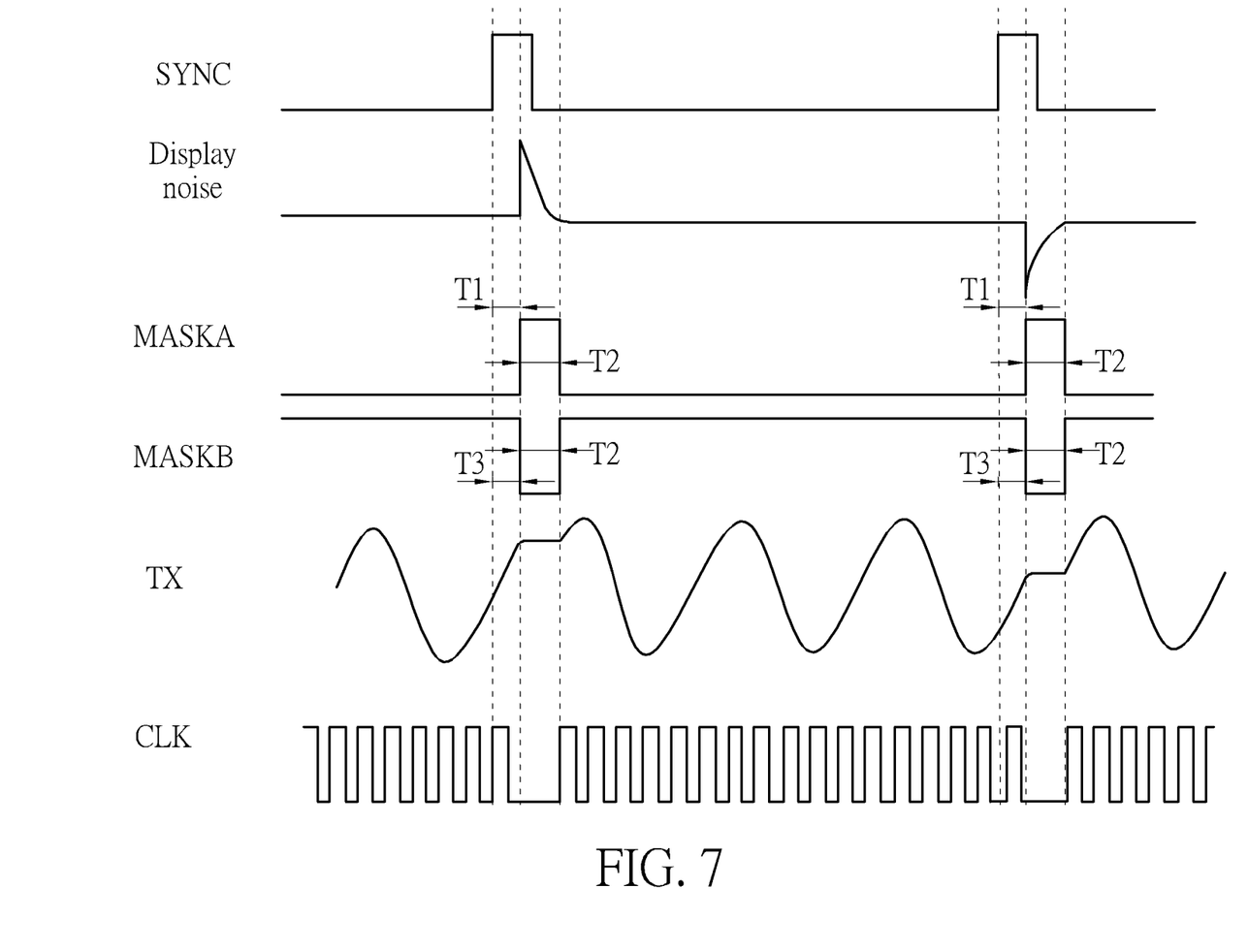
FIG. 7 illustrates waveforms of signals in the touch sensing circuit of FIG. 5 according a second embodiment of the present invention.

In another embodiment, the control signal generator 260 is further arranged to control the clock signal CLK and the driving signal TX. While asserting the mask signal MASKA, the control signal generator 260 could stop providing the clock signal CLK to the ADC 253, such that a conversion operation of the ADC 253 will be accordingly suspended. In addition, the control signal generator 260 could provide a control signal TXL to the driving control circuit 140 to freeze a state of the driving signal TX while asserting the mask signal MASKA. Please refer to FIG. 7 for further details. As illustrated, during time period T2, the clock signal CLK is stopped and the state of the driving signal TX is frozen. After the mask signal MASKA is de-asserted, the clock signal CLK recovers and the driving signal TX continues to oscillate. In various embodiments, the time period in which the clock signal CLK is stopped could be longer or shorter than the time period T2 in which the switching unit 251 is conducted. Furthermore, the time period in which the state of the driving signal TX is frozen could be longer or shorter than the time period T2 in which the switching unit 251 is conducted.

According to one embodiment of the present invention, the synchronization signal is Hsync signal for driving the display panel 12. In addition, the time period T2 in which the switching unit 251 is conducted by the mask signal MASKA and the switching unit 255 is not conducted by the mask signal MASKB could be longer or shorter than the time period in which the Hsync signal for driving the display panel 12 is asserted.

Embodiments III

Figure 8:
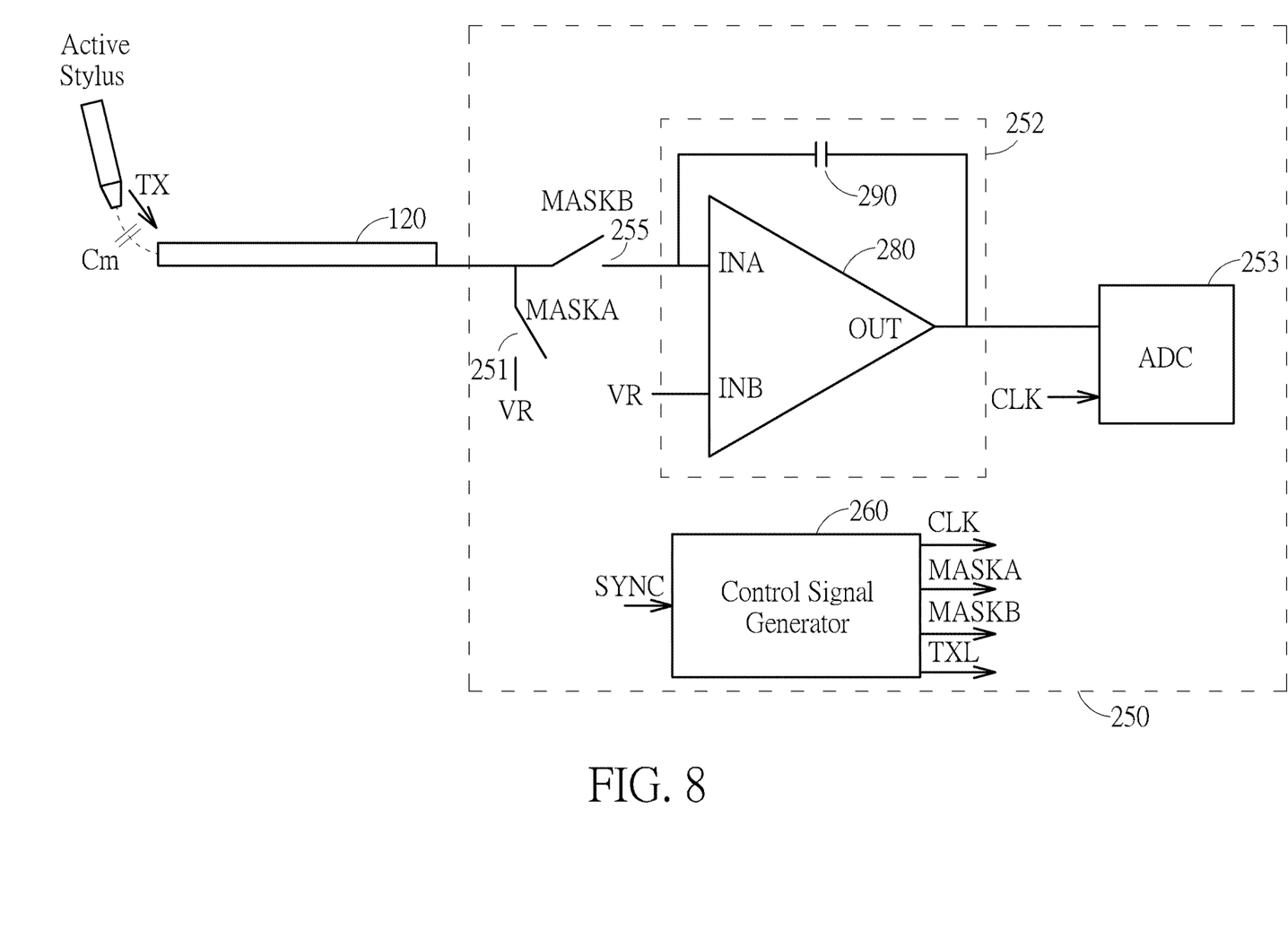
FIG. 8 illustrates a schematic diagram of a touch sensitive device with an active stylus according one embodiment of the present invention.
Figure 9:
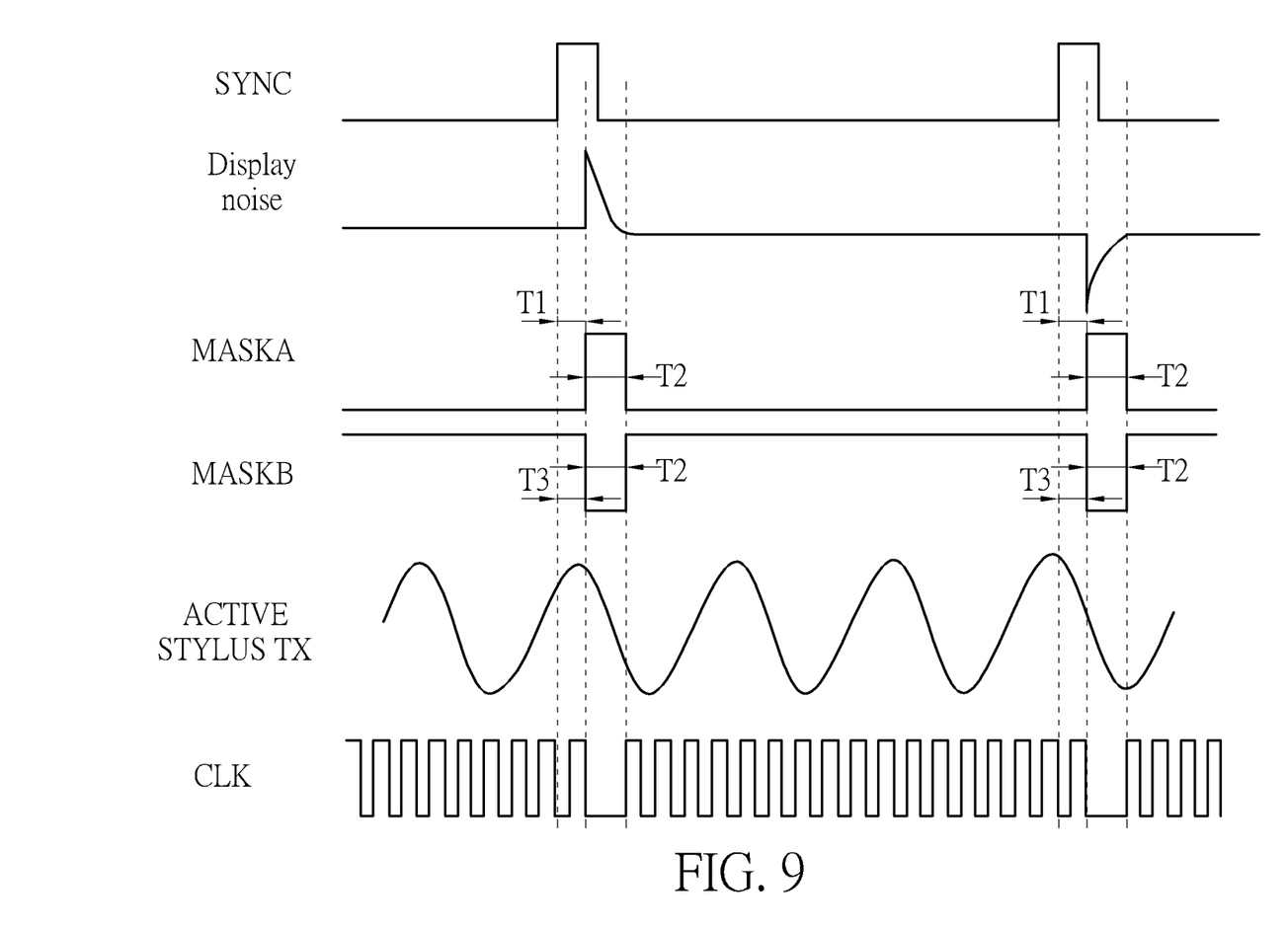
FIG. 9 illustrates waveforms of signals in the touch sensing circuit of FIG. 8 according a first embodiment of the present invention.

According to an embodiment of the present invention, the touch sensitive device 10 may rely on an active stylus to trigger a touch event. Please refer to FIG. 8 and FIG. 9 for further details. In such embodiment, the driving signal TX could be generated from the active stylus, and thus the state of the driving signal TX cannot be controlled by the control signal generator 260 in the sensing control circuit 250. However, the clock signal CLK provided to the ADC 253 could be still stopped once the mask signal MASKA is asserted and recovered when the mask signal MASKA is de-asserted.

In conclusion, the present invention introduces switching units controlled according to synchronization signals of the display panel to a sensing control circuit. These switching units could prevent charges introduced by the noise from the display panel to be collected by the sensing control circuit when refresh of the display panel is being performed. At this time, the present invention also suspends operations of ADC or driving control circuit. Hence, the present invention can effectively prevent noise from the display panel affecting the touch sensing operation.

Embodiments in accordance with the present invention can be implemented as apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch sensing circuit for use in a touch sensitive device, comprising:
   an integrator circuit, coupled to at least one sensing electrode of a touch panel in the touch sensitive device, arranged to collect charges on the at least one sensing electrode and accordingly generate an output sensed signal;
   a first switching circuit, coupled to a first end of the at least one sensing electrode, arranged to selectively couple the first end of the at least one sensing electrode to a reference voltage level according to a first mask signal;
   a second switching circuit, coupled between the first end of the at least one sensing electrode and an input terminal of the integrator circuit, arranged to selectively conduct a path between the first end of the at least one sensing electrode to the input terminal of the integrator circuit according to a second mask signal that is generated by a control signal generation circuit according to a synchronization signal of a display panel in the touch sensitive device, wherein the second switching circuit does not conduct the path between the first end of the at least one sensing electrode to the input terminal of the integrator circuit in response to an assertion of the synchronization signal; and
   the control signal generation circuit, coupled to the first switching circuit, arranged to generate the first mask signal according to the synchronization signal, wherein the first switching circuit couples the first end of the at least one sensing electrode to the reference voltage level when the synchronization signal is asserted.

2. The touch sensing circuit of claim 1, wherein the integrator circuit comprises:
   an amplifier, having a first input terminal as the input terminal of the integrator circuit, a second input terminal, and an output terminal, wherein the first input terminal is coupled to the first end of the at least one sensing electrode, the second input terminal is coupled to the reference voltage level, and the output sensed signal is generated at the output terminal; and
   an integrating capacitor, coupled between the first input terminal and the output terminal of the amplifier.

3. The touch sensing circuit of claim 2, wherein the first switching circuit is coupled between the first input terminal and the output terminal of the amplifier, wherein the first switching circuit conducts a path between the first input terminal and the output terminal of the amplifier, thereby allowing the first end of the at least one sensing electrode to be virtually shorted to the reference voltage level when the synchronization signal is asserted.

4. The touch sensing circuit of claim 3, further comprising:
an analog-to-digital converter, coupled to the output terminal of the amplifier, arranged to convert the output sensed signal into digital values, wherein an operation of the analog-to-digital converter is controlled according to a clock signal whose timing is associated with a timing of the first mask signal and, the operation of the analog-to-digital converter is suspended in response to an assertion of the synchronization signal.

5. The touch sensing circuit of claim 3, further comprising:
a driving control circuit, coupled to at least one driving electrode of the touch panel, arranged to provide a driving signal to the at least one driving electrode, wherein an operation of the driving control circuit is controlled according to an assertion of the synchronization signal and a period in which a state of the driving signal is frozen is associated with the first mask signal.

6. The touch sensing circuit of claim 2, wherein the first switching circuit is coupled between the first end of the at least one sensing electrode and the reference voltage level, wherein the first switching circuit conducts a path between the first end of the at least one sensing electrode and the reference voltage level, thereby allowing the first end of the at least one sensing electrode to couple to the reference voltage level when the synchronization signal is asserted.

7. The touch sensing circuit of claim 6, further comprising:
an analog-to-digital converter, coupled to the output terminal of the amplifier, arranged to convert the output sensed signal into digital values, wherein an operation of the analog-to-digital converter is controlled according to a clock signal whose timing is associated with a timing of the first mask signal and, the operation of the analog-to-digital converter is suspended in response to an assertion of the synchronization signal.

8. The touch sensing circuit of claim 6, further comprising:
a driving control circuit, coupled to at least one driving electrode of the touch panel, arranged to provide a driving signal to the at least one driving electrode, wherein a period in which a state of the driving signal is frozen is associated with the first mask signal.

9. The touch sensing circuit of claim 1, wherein there is a time difference between an assertion of the first mask signal and an assertion of the synchronization signal, and the time difference is variable and controllable by the control signal generation circuit.

10. The touch sensing circuit of claim 1, wherein a time period in which the first mask signal is asserted is longer or shorter than a time period in which the synchronization signal is asserted.

11. A touch sensitive device, comprising:
a display panel;
a touch panel, disposed above the display panel, having a plurality of driving electrodes and a plurality of sensing electrodes;
a touch sensing circuit, coupled to the touch panel, arranged to detect a touch event on the touch panel, comprising:
a driving control circuit, coupled to at least one of the driving electrodes, arranged to provide a driving signal to the at least one of the driving electrodes;
a sensing control circuit coupled to at least one of the sensing electrodes and arranged to generate an output sensed signal according to charges on the at least one of the sensing e!ectrodes, comprising: p3 an integrator circuit, coupled to the at least one of the sensing electrodes, arranged to collect charges on the at least one of the sensing electrodes and accordingly generate the output sensed signal;
a first switching circuit, coupled to a first end of the at least one of the sensing electrodes, arranged to selectively couple the first end of the at least one of the sensing electrodes to a reference voltage level according to a first mask signal;
a second switching circuit, coupled between the first end of the at least one of the sensing electrodes and an input terminal of the integrator circuit, arranged to selectively conduct a path between the first end of the at least one of the sensing electrodes to the input terminal of the integrator circuit according to a second mask signal that is generated by a control signal generation circuit according to a synchronization signal of the display panel. wherein the second switching circuit does not conduct the path between the first end of the at least one of the sensing electrodes to the input terminal of the integrator circuit in response to an assertion of the synchronization signal; and
the control signal generation circuit, coupled to the first switching circuit, arranged to generate the first mask signal according to the synchronization signal, wherein the first switching circuit couples the first end of the at least one of the sensing electrodes to the reference voltage level when the synchronization signal is asserted.

* * * * *